A. SHOCK HEATING

B. EQUILIBRATION

C. ADIABATIC COMPRESSION

D. BURNING AND DIRECT CONVERSION

United States Patent Office 3,748,226
Patented July 24, 1973

3,748,226
PULSED HIGH-BETA FUSION REACTOR
Fred L. Ribe, Sibley C. Burnett, and William R. Ellis,
Los Alamos, N. Mex., assignors to the United States
of America as represented by the United States Atomic
Energy Commission
Filed May 18, 1972, Ser. No. 254,689
Int. Cl. G21b 1/00
U.S. Cl. 176—3          15 Claims

ABSTRACT OF THE DISCLOSURE

A fusion reactor in which the thermonuclear plasma is produced by a staged theta pinch having two distinct energy sources, one for shock heating and one for adiabatic compression. In the reactor core the plasma is surrounded by a thin liquid-metal-cooled vacuum wall which also serves as a shock heating coil. This coil is driven by high voltage circuits whose energy content is only a few percent of that of the total system. The low-voltage compressional and confining magnetic field, whose energy is preponderant, has a risetime of a few milliseconds and is generated by a multiturn coil whose radius is substantially greater than that of the shock-heating coil. The compression coil operates near room temperature, and the system is sufficiently economical of joule losses that they can largely be made up by direct energy conversion from the expansion of the high-beta plasma against the magnetic field during the burning pulse. The compression coil is protected from excessive nuclear radiation and heating by a portion of the neutron-moderating, tritium-breeding blanket. This inner portion of the blanket operates at a temperature as high as about 800° C. Magnetic energy is switched reversibly into the compression coil from a cryogenic magnetic energy store situated outside the reactor core. The compression magnetic energy is returned to the store at the end of each power pulse, which lasts approximately 100 msec. These pulses are separated by times of the order of a few sec. Refueling and flushing of the spent plasma between burning pulses are accomplished by flowing D-T gas through the vacuum chamber.

BACKGROUND OF THE INVENTION

The invention described herein was made in the course of, or under, a contract with the U.S. Atomic Energy Commission. It relates to fusion reactors and more particularly to fusion reactors in which a D-T burn of high-beta plasma is accomplished through compressional heating produced by a pulsed magnetic field.

One approach to achieving controlled fusion makes use of magnetic pinches. A column of high temperature deuterium and tritium (D-T) plasma is produced by a rapid compression of relatively cold, but ionized, gas. The compression heating is accomplished by the application of a large magnetic field which compresses the preionized plasma and subsequently holds the compressed plasma near the center of the reaction chamber out of contact with material walls. The pinching magnetic field serves both to heat and contain the plasma. There are two basic types of pinch, depending on the direction of flow of electric currents which provide the magnetic field. When the current flows along the plasma column, the magnetic pinch that results is termed a z pinch, whereas when the current flows arond the plasma column, the resulting pinch is called a $\theta$ pinch. This application is limited to the use of $\theta$ pinches.

The quantity beta ($\beta$) is the ratio of plasma pressure to that of the confining magnetic field. In a fusion reactor both pressures are on the order of hundreds of atmospheres. High-beta plasmas react strongly on the confining magnetic field, pushing it aside instead of being almost completely permeated by it, as is the case with low-beta plasmas. The factor $\beta^2$ measures how efficiently magnetic field is utilized in a fusion reactor. The literature indicates that $\beta$ itself must be greater than about 10% if the magnetic fields in a fusion reactor are to be small enough to accommodate present day superconductor technology.

The art discloses that in high-voltage $\theta$ pinches, ion heating has typically been done by a two-stage process: (a) shock heating by means of a fast implosion during the first few hundred nanoseconds after switching on a main capacitor bank, and (b) adiabatic compression of the shock-heated gas. Largely as a result of technological history, both processes have utilized the energy from a single capacitor bank. Thus, early feasibility studies of pulsed $\theta$-pinch reactors dealt with systems in which a single-turn coil furnished both the shock heating and adiabatic compression fields. The magnet coil was situated inside the neutron blanket and was gas cooled. Systems of this type present difficulties having to do with materials properties of the compression coil and with obtaining a sufficiently large excess of reactor energy output over the joule losses incurred in producing the magnetic fields. Additionally, it is known that in a fusion reactor it will be uneconomical to produce the compression field by means of capacitors. It thus appears highly desirable to provide separate energy sources for the shock heating and adiabatic compression stages.

In 1969, Gribble and Ribe stated that some form of magnetic storage would be desirable if the shock heating and adiabatic compression functions are indeed separated and produced by separate energy sources. They indicated that by employing transmission line techniques, e.g., Blumlein lines, it is possible to obtain the high voltages necessary for the shock heating stage while achieving adiabatic compression from a magnetic energy storage system. See Los Alamos Scientific Laboratory Report LA–4194–MS (1969). Schemes for storing large amounts of magnetic energy are known in the art. See, e.g., J. A. Fox, "Superconducting Energy Storage," Electrical Review, p. 335 (Mar. 12, 1971).

A pulsed high-beta fusion reactor has several advantages over low-beta steady-state reactors. The literature discloses that in principle it is possible to obtain direct energy conversion from the expansion of the high-beta D-T burning plasma against the confining magnetic field. This is not possible with a low-beta plasma. In a steady-state reactor, the confining magnetic field is continuously present. This may require that the coolant used as the heat transfer agent be pumped across magnetic field lines. If this coolant is liquid metal, i.e., liquid lithium, and thus an electrical conductor, substantial power may be required to overcome resulting magnetohydrodynamic forces. Additionally, the presence of the magnetic field lines causes the liquid lithium flow along the lines to be laminar rather than turbulent within the coolant flow channels of the reactor. It is well known in the art that a turbulently flowing fluid can remove much more heat than one flowing laminarly. These problems with flowing liquid lithium are largely nonexistent in a pulsed reactor of the type herein disclosed because the confining field is only present for a short portion of the duty cycle. Thus, the field-free heat-transfer coefficient in a pulsed reactor may be about an order of magnitude higher than is possible in a steady-state reactor.

SUMMARY OF THE INVENTION

The fusion reactor of this invention makes use of a staged, $\theta$ pinch having two distinct energy sources, one for shock heating and another for adiabatic compression of the plasma. The shock heating results from the action of a first magnetic field produced by a shock-heating coil which also serves as the wall of the vacuum chamber containing the plasma. This coil is driven by high-voltage circuits whose energy content is derived from Blumlein lines and from a capacitor bank and is only about one percent of that of the total system. The shock-heating magnetic field serves to implode the plasma toward the center of the vacuum chamber, where over a few msec. the ion energy associated with the radially directed motion of the plasma implosion thermalizes. A second magnetic field is then applied to the plasma by a multiturn compression coil whose radius is substantially greater than that of the shock-heating coil. This low-voltage compressional and confining magnetic field, whose energy is preponderant, adiabatically compresses the plasma still further and results in a D-T burn lasting for tens of msec. The 3.5-Mev. alpha particles produced by the D-T burn serve to further heat the plasma, which has $\beta \approx 1$, and in doing so cause it to expand against the second magnetic field. This expansion does work which is about 7% of the thermonuclear neutron energy produced by the D-T fusion reactions. Means are provided for reversibly switching magnetic energy into and out of the compression coil from a cryogenic magnetic store located outside the reactor core. Means are further provided for directly converting the work performed by the expansion of the plasma into electrical energy. Fueling and flushing of the plasma are accomplished by flowing D-T gas through the vacuum chamber between pulses.

Located between the shock-heating coil and the compression coil is an inner blanket containing liquid lithium wherein all but a few percent of the neutron energy produced by the D-T reactions is collected. The liquid lithium serves also to cool the shock-heating coil. Neutron multiplying and moderating materials, as, e.g., respectively, beryllium and graphite, may be readily incorporated into the inner blanket. Means are provided for circulating the liquid lithium of the inner blanket through a heat exchanger located externally to the reactor and for removing tritium from it. The shock-heating coil is electrically insulated from both the plasma within the vacuum chamber and the liquid lithium of the inner blanket. To reduce eddy current losses within the inner blanket, the materials of that blanket are divided into segments by a plurality of radially directed electrical insulators and metal segments. Because the inner blanket is at a temperature as high as about 800° C., the compression coil is thermally insulated from it. To reduce joule losses in the compression coil and preserve mechanical integrity, it may be cooled by circulation of a cooling fluid through it. Adjacent to the outer edge of the compression coil and separated from it by a thermal insulator is an outer neutronic blanket which may be liquid lithium or a solid such as lithium hydride, depending on its operational temperature. Beyond the outer neutronic blanket is a biological shield wherein all escaping radiation is stopped or attenuated to negligible levels.

The shock-heating coil is connected to the compression coil by a plurality of radially directed transmission lines. Further, a plurality of transmission lines directed radially inward from the circumference of the reactor connect the compression coil with both the capacitor bank used to energize the shock-heating coil and the magnetic energy store for the compression coil. The use of the same transmission lines for both high-voltage and magnetic energy transfer is a novel feature of this invention.

In the preferred embodiment of this invention, the compression coil operates at near room temperature, and the system is sufficiently economical of joule losses that they can largely be made up by direct conversion from the expansion of the high-beta plasma against the magnetic field during the burning pulse.

BRIEF DESCRIPTION OF THE DRAWINGS

PRINCIPLES OF A STAGED, THETA-PINCH PULSED REACTOR (1) Plasma heating and burning FIG. 1 shows a cross section of the essential portions of the staged $\theta$ pinch of this invention. The reactor may be linear or toroidal, although toroidal is preferred because of the end-loss problems associated with a linear system. The shaded areas 3, 7 represent magnetic field perpendicular to the plane of the figure. The inwardly pointing arrows of FIGS. 1A, 1C represent magnetic energy flow into the system. The outwardly pointing arrows of FIG. 1D represent magnetic energy pushed out of the system by the expanding plasma.

Figure 1:
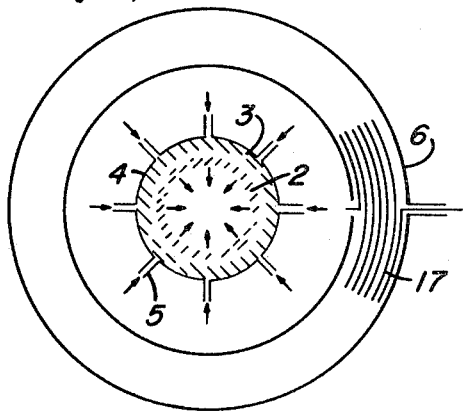
FIG. 1 illustrates the plasma heating and burning sequence in a staged, $\theta$-pinch reactor.
Figure 1:
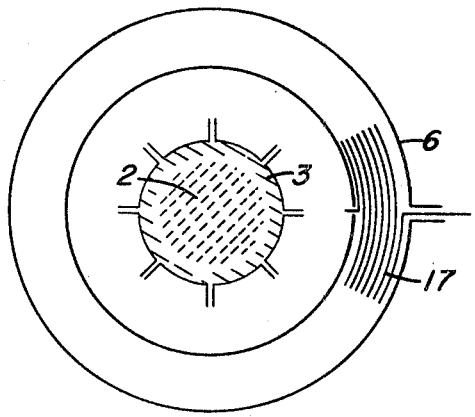
Figure 1:
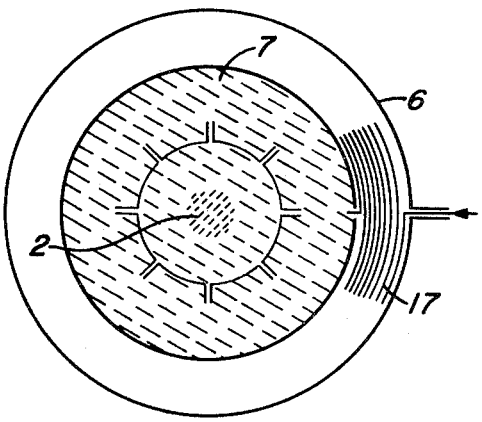
Figure 1:
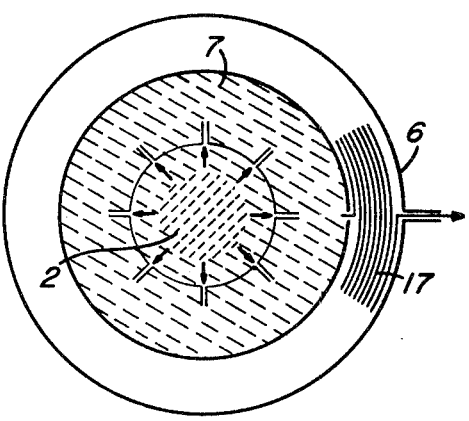

In the shock-heating stage of FIG. 1A, a magnetic field 3 having a rise time of a few tens of msec. and a magnitude of a few tens of kg. drives the implosion of a preionized plasma 2 whose density is of the order of $10^{15}$ cm.$^{-3}$. Magnetic field 3 is produced by electrical energy fed into shock-heating coil 4 through a plurality of transmission line feeds 5. After the ion energy associated with the radially directed motion of the plasma implosion has been thermalized, the plasma 2 assumes a temperature $T_E$ characteristic of equalibration of ions and electrons. After a few msec. adiabatic compression field 7, having a rise-time of about 10 msec. and a final magnitude $B_f$ of about 100 to 200 kg., is applied by energizing compression coil 6. The plasma 2 is compressed to a smaller radius as shown in FIG. 1C, and its temperature is raised to a value $T_f$ of about 10–15 kev. As the D-T plasma burns for several tens of msec., it produces 3.5-mev. alpha particles which partially thermalize with the D-T ions and the electrons as the burned fraction of plasma increases to about 10%. As a result the plasma is further heated. Since it has $\beta \approx 1$, and assuming $B_f$ to be approximately constant, the plasma 2 expands (FIG. 1D) against the magnetic pressure $B_f^2/8\pi$, doing work $\Delta W$ which is about 7% of the thermonuclear neutron energy produced by the D-T fusion reactions. This work produces an EMF which forces magnetic energy out of the compression coil and back into the compression magnetic storage system.

(2) Magnetic energy storage

Figure 2:
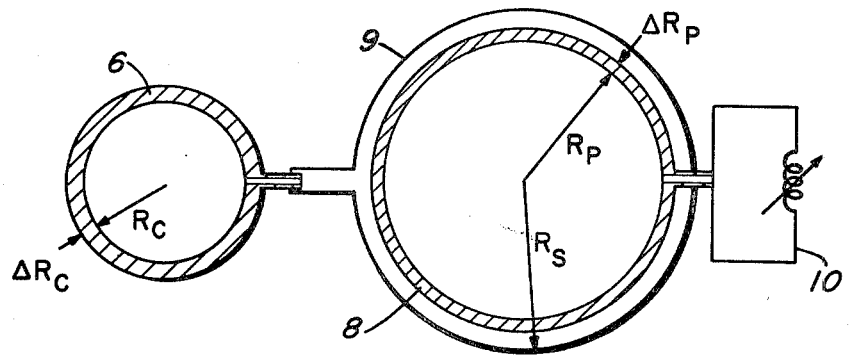
FIG. 2 is a schematic of a circuit for reversible transfer of magnetic energy pulses from a cryogenic magnetic energy store to the compression coil of the staged, $\theta$-pinch reactor of this invention.
Figure 2:
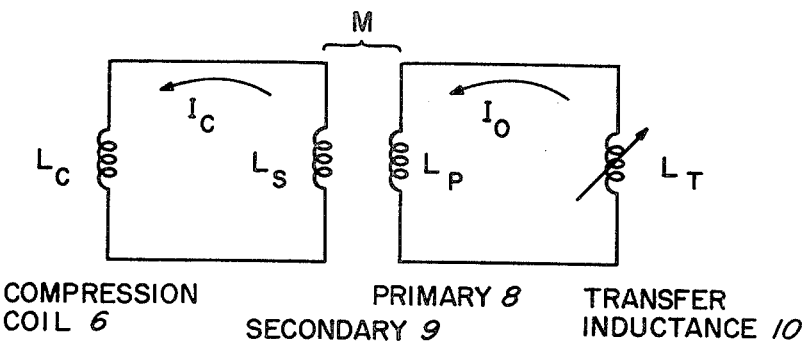

The most economical way to store large amounts of magnetic energy is by means of a cryogenic system. The cryogenic magnetic energy source must supply the magnetic compression energy in pulses of $\sim$10 msec. rise time and several tens of msec. duration, separated by times of a second or more. A circuit which accomplishes this pulsed energy transfer in a reversible manner is shown in FIG. 2. Large amounts of magnetic energy ($\sim$550 mj. per meter of reactor length) are stored in the cryogenic storage inductor which constitutes the primary 8 of a transformer system having a secondary 9 which may comprise only a single turn. This secondary 9 drives the room-temperature (or possibly liquid-$N_2$-cooled) compression coil 6. The variable inductor $L_T$ is the transfer element 10 in series with the primary coil 8, and its value is small when there is no energy in the compression coil 6. As $L_T$ increases, the magnetic flux in the primary decreases, inducing a flux in the compression coil $L_C$. When $L_T$ decreases the flux and magnetic field are removed from $L_C$ and returned to the storage coil. Note that in this system the transformer coupling allows magnetic energy to be stored in the primary inductor at a lower value of magnetic field than that in the compression coil.

Figure 3:
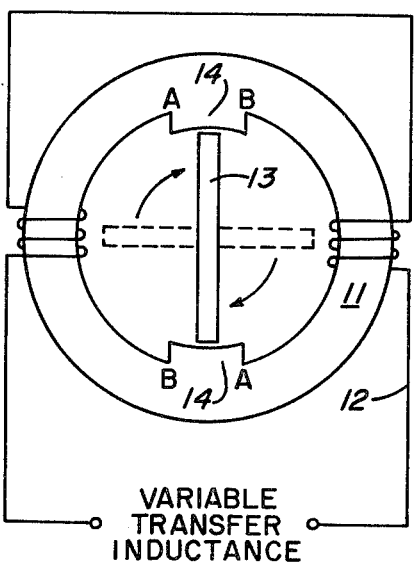
FIG. 3 is a schematic of a motor generator with superconducting windings which may serve as the variable inductor in the magnetic energy transfer circuit of FIG. 2.

In FIG. 2 the variable inductor 10 controls the transfer of more energy than is stored in it at any instant of time. For a coupling coefficient $k=M^2/L_P L_S=1$, $L_C/L_S=1$, and $L_T(\text{max.})/L_P$ very large, the energy $W_C$ transferred to the compression coil is ¼ $W_{PO}$, where $W_{PO}$ is the initial value of magnetic energy in the primary storage inductor. The energy $W_T$ in the transfer inductor is at most ⅛ $W_{PO}$ or ½ $W_C$. Since $L_S$ has the same energy as $L_C$, there is also a total of ½ $W_{PO}$ in the secondary circuit for large values of $L_T$. Since $L_T$ and $L_P$ then have very small current, the remaining ½ $W_{PO}$ must be accounted for as work done on $L_T$ which appears in the form of mechanical energy. Thus $L_T$ itself is a mechanical element capable of storing ½ $W_{PO}$ as kinetic energy. It may be a motor generator with superconducting windings 12 such as that shown schematically in FIG. 3. Here stator 11 constitutes part of a magnetic circuit which is closed by rotor 13 when it is in the vertical position shown by the solid lines (large $L_T$). When rotor 13 is in the horizontal (dashed) position, the magnetic circuit is open and $L_T$ assumes its minimum value. To provide smooth cyclic energy transfer a flywheel is desirably attached to the axle of the rotor. As the rotor enters stator pole 14 at points A, work is done to speed it up, at points B kinetic energy is reconverted to magnetic energy in the primary inductor of FIG. 2. Alternatively, instead of an iron magnetic circuit a set of flux displacers made of moving cryogenic conductors could be used. Note that the variable inductor of FIG. 3 requires no moving current contacts and no net power input, except that necessary to supply joule losses in the circuit of FIG. 2.

(3) Time history of the thermonuclear cycle

Figure 4:
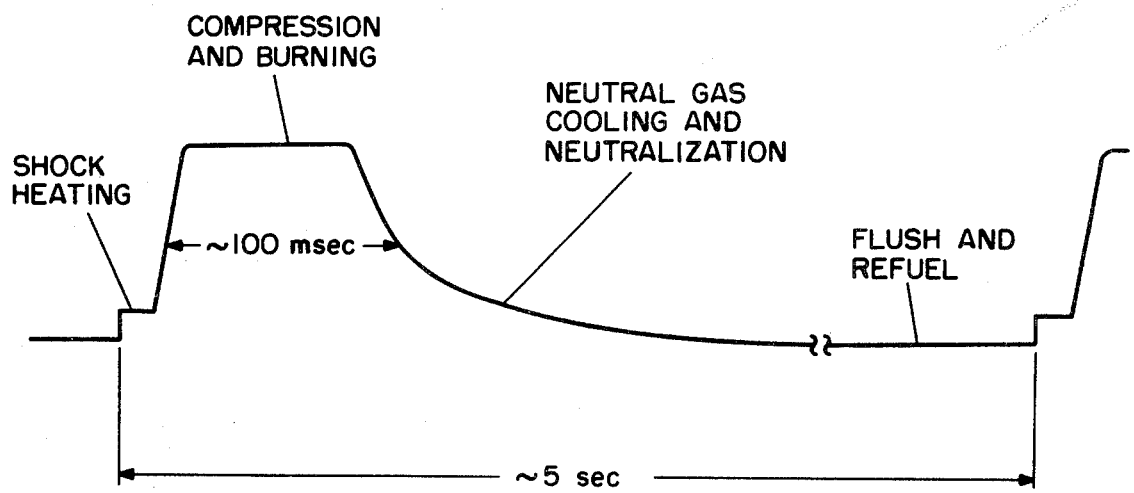
FIG. 4 indicates schematically the variation of magnetic field with time during a typical pulse in the staged, $\theta$-pinch reactor.

FIG. 4 shows a typical time history of one cycle of operation of a pulsed, $\theta$-pinch reactor. The shock-heating field is applied very suddenly and sustained for a time sufficient for the equilibrated plasma of temperature $T_E$ to be "picked up" by the compression field and compressed to its final density $n_f$ and temperature $T_f$ before the thermonuclear burn. After the burn, when the plasma has of the order of 10% helium ions, the magnetic field is relaxed to some lower value sufficient to keep the expanded, and now nonburning, plasma off the first wall while neutral gas is admitted to remove its heat and neutralize it. During the remainder of the cycle "off time," the plasma is flushed out of the system and is replaced by new gas or cool plasma with negligible helium content.

The ratio $\xi$ of the time between pulses to the burning time $\tau$ determines the average thermal power throughput $P_W$ of the first wall (which is the same as shock-heating coil 4 of FIGS. 1, 5, and 7), as well as its average power output. It turns out that the duty factor $\xi^{-1}$ is a few percent. Thus if $P_W$ is chosen as 10 mw./m.² (1 kw./cm.²), the instantaneous throughput during the burning pulse is one to two orders of magnitude higher. Heat transfer will not balance heat deposition during the burning pulse, and care must be taken to design for reasonable temperature rises and thermal gradients in the first-wall and blanket materials. During the off-time of the reactor cycle, heat transfer to liquid lithium at the first wall and in the blanket reduces the material temperatures to their ambient values. About the same choice of duty factor which places $P_W$ in the 10 mw./m.² range will also lead to reasonable values of heat-transfer coefficient, i.e., to reasonable flow conditions for the lithium.

(4) Gas-dynamic fuel cycling

In a pulsed fusion reactor alpha-particle "ash" resulting from the deuterium-tritium (D-T) fuel burnup can be removed and new fuel injected by D-T gas flow between burning pulses. Thus no diverter is required, as in the case of a steady-state toroidal reactor. The gas between the hot central plasma and the first wall can be used to cool, neutralize, and replace the partially burned D-T plasma. Sputtering problems are alleviated, since heat transfer to the wall, which would otherwise occur by energetic ions, now occurs by means of neutral atoms and ultraviolet and visible radiation. During much of the time between pulses the gas-plasma region can be described by quasisteady fluid flow similar to that discussed by Lehnert, Nucl. Fusion 8, p. 173 (1968).

DESCRIPTION OF THE PREFERRED EMBODIMENT

Figure 5:
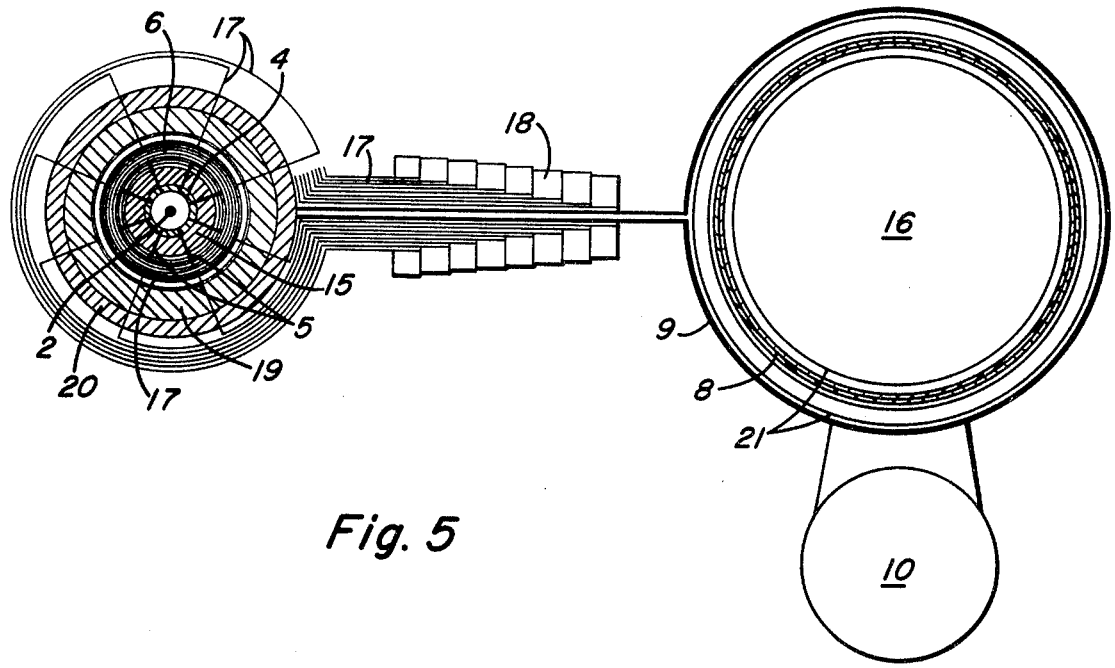
FIG. 5 shows a cross-sectional schematic view of the major components of the staged, $\theta$-pinch reactor of this invention.

A schematic diagram of the overall reactor system is shown in FIG. 5. Shock-heating coil 4 with eight radial transmission-line feeds 5 is surrounded by a Li-Be-C blanket 15 which has three functions: (a) It transforms to thermal energy all but a few percent of the 14 mev. neutron energy generated by the plasma; the flowing lithium carries the thermal energy out to heat exchangers in the electrical generating plant. (b) It breeds tritium by means of the $^7\text{Li}(n,n'\alpha)\text{T}$ reaction (endothermic) for fast neutrons and the $^6\text{Li}(n,\alpha)\text{T}$ reaction (exothermic) for slow neutrons. (c) The high Reynolds-number flow of liquid lithium cools the first wall (shock-heating coil 4).

Outside inner blanket region 15 is multiturn compression coil 6 which is energized by the slowly rising current ($\sim$10 ka. per cm. of its length) from the secondary 9 of the cryogenic magnetic energy store 16. Compression coil 6 consists of the coiled-up parallel-sheet transmission lines 17 which bring in the high voltage to feed slots 5 of shock-heating coil 4. Each side of the horizontal feed from the secondary of the magnetic energy storage coil also serves as a ground plane for the high-voltage shock-heating circuit (including crowbar capacitors 18 for sustaining the shock-heating field $B_s$). Each transmission line 17 delivers of the order of 100 kv. to one slot 5 of the shock-heating coil 4.

Outside compression coil 6 is an outer neutron blanket 19 for "mopping up" the last few percent of neutron energy and breeding the last few percent of tritium. Unlike inner blanket 15 which would run at temperatures as great as 800° C. to provide high thermal efficiency for an electrical generating plant, this portion of blanket could run at a much lower temperature. Surrounding outer blanket 19 is radiation shield 20, and beyond the shield the radially emerging transmission lines 17 are brought around to make contact with the current feeds from the magnetic energy store and the high-voltage shock-heating circuits. To the right is shown the cryogenic energy storage coil of FIG. 2 in its Dewar 21. At the bottom of the storage coil is the variable-inductance transfer element 10.

Figure 6:
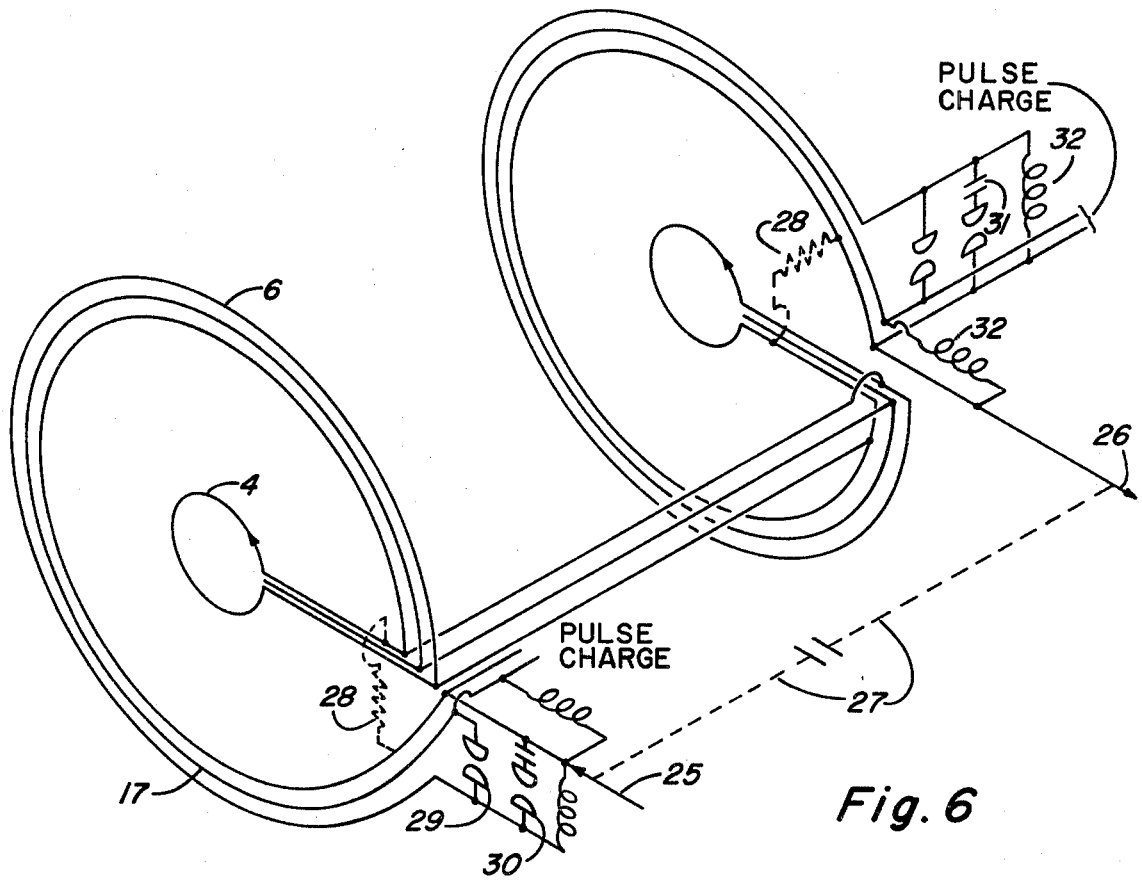
FIG. 6 is a schematic diagram showing dual use of coiled-up transmission lines as compression coils.

A novel feature of the reactor shown in FIG. 5 is the ability to drive compression current through shock-heat-transmission lines. A schematic diagram of a circuit arrangement for accomplishing this is shown in FIG. 6. The diagram is simplified to show a shock-heating coil 4 fed by a single Blumlein (3-conductor transmission line 17 of one turn. It will be apparent that in a reactor, a plurality of multiturn transmission lines 17 are used. In FIG. 6, the left-hand compression coil 6 carries current clockwise over its length not shown, but of the order of 1 m.). The current is fed 25 from the secondary coil 9 of magnetic energy store 16 (see FIG. 5). This current then flows axially to the right-hand compression coil and emerges clockwise to the other secondary-coil feed 26.

In order to keep the voltage in the shock-heating coil 4 from being induced and multiplied in the multiple turns of compression coil 6 two alternatives are possible: (a) The two resistors 28 shown by dashed lines may be used to provide short circuits to the fast changing return flux of the shock-heating coil, thus allowing no net flux to thread the compression coil. The resistors (e.g., thin stainless-steel straps) would be permeable to the slowly rising compression field as it flows through them with negligible energy loss, (b) The fast return flux is allowed to thread all of the coiled-up turns. Adjacent compression coils are shorted together at their inputs by the small capacitor 27 shown by means of the dashed lines. The induced voltage is absorbed in the multiple coiled-up turns.

At the outer ends of each of the transmission lines 17 are shown two spark gaps 29, 30. The inner one 29 initiates the transmission line voltage wave from its charged center conductor. The outer spark gap 30 is used to switch on its series capacitor 31 to sustain the shock-heating field until the compression field "overtakes it" in the adiabatic compression process (cm. FIG. 4). The chokes 32 allow passage of the slowly changing compression current to the three transmission-line conductors in parallel while absorbing the shock-heating voltages.

Figure 7:
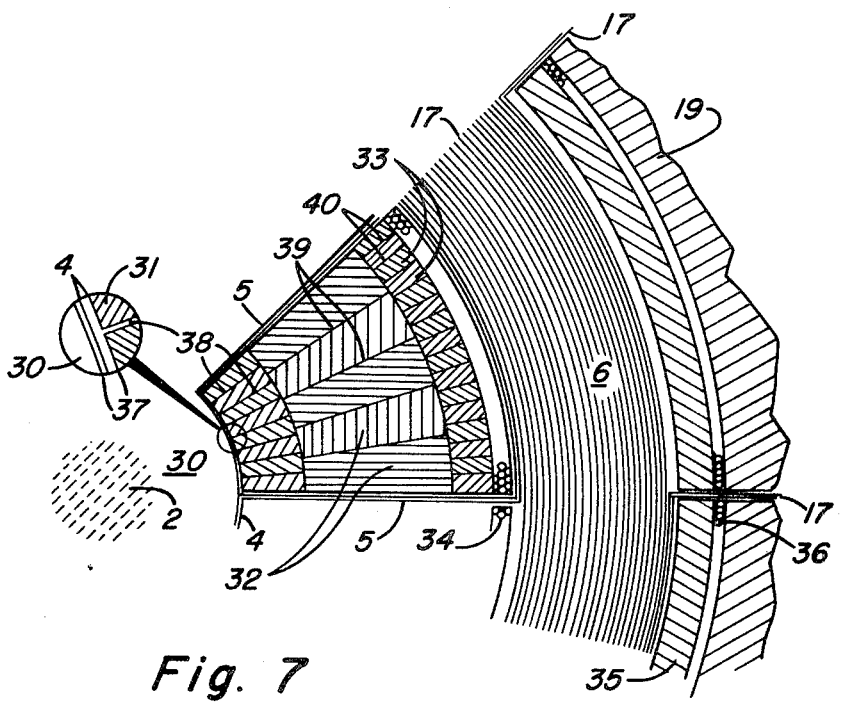
FIG. 7 is a schematic diagram of a portion of the core and compression coil of the staged, $\theta$-pinch reactor.

The reactor core is that portion of the reactor inside the compression coil. FIG. 7 is a schematic diagram of a portion of the core and compression coil. During burning, vacuum 30 separates plasma 2 from shock-heating coil 4 which also serves as the first wall of the reactor. Immediately adjacent to coil 4 is inner blanket 15 wherein most of the neutron energy is converted to thermal energy and the maximum amount of tritium breeding occurs. Inner blanket 15 may take a variety of forms. As shown in FIG. 7, it has an inner region 31 composed of normal lithium plus beryllium, a middle region 32 composed of graphite, and an outer region 33 consisting substantially of $^6$Li. The beryllium is present in inner region 31 to act as a neutron multiplier and thus enhance the tritium breeding rate. The purpose of the graphite is to moderate the neutrons and thus increase the $^6$Li reaction rate for tritium production. Blanket 15 is at a temperature as great as about 800° C. during operation of the reactor. Because a substantial amount of the energy from the neutrons is deposited within the graphite of region 32, means are provided for a flow of liquid lithium in intimate contact with the graphite. Outside of blanket 15 is compression coil 6 which operates at room temperature or below. To obtain the required temperature differential, thermal insulator 34 is placed between blanket 15 and compression coil 6. Materials capable of maintaining a temperature differential of this size are known in the insulating arts. To ease the requirements placed on the material of insulator 34, a cooling fluid such as gaseous helium may be flowed through it. During operation, very substantial outward pressure develops in coil 6 as a result of the magnetic forces produced. Coil 6 which consists of a plurality of coiled copper transmission lines 17 has insufficient strength to resist this pressure. Coil backing 35 which may consist of titanium or steel is therefore provided as a structural support to contain the hoop forces developed in coil 6 when the adiabatic compression field is in existence. Outer blanket 19 is provided to allow tritium breeding with the few percent of the neutrons that are not collected within inner blanket 15. Because energy is deposited in outer blanket 19 by the reacting neutrons, thermal insulator 36 is provided between coil backing 35 and blanket 19. The material of insulator 36 may be the same as that of insulator 34, although it need not be. In any case, because of the smaller temperature differential between coil backing 35 and blanket 19, the size of insulator 36 will be smaller than that of insulator 34 if the same material is used for both. Outside of blanket 19 is radiation safety shield 20 (shown in FIG. 5). The purpose of shield 20 is to ensure that no neutrons or gamma rays escape from the reactor.

A plurality of transmission lines 17 enter coil 6 through shield 20 and blanket 19.

Because shock-heating coil 4 will be at a temperature as great as about 800° C., as will be the plurality of transmission line feeds 5 to it, it is necessary that they be made of an appropriate refractory metal or alloy. Metals appropriate for this purpose include niobium, vanadium, and molybdenum. The advantages and disadvantages associated with each of these materials are known in the art. Coil 4 will have large amounts of electrical energy fed into it in relatively short times. It is therefore imperative that it be electrically insulated from both plasma 2 and the lithium of blanket 15 since both are conductors. In like manner, the transmission line feeds 5 to coil 4 must be similarly insulated. Electrical insulator 37 for coil 4 may be a ceramic such as $Al_2O_3$ or it may be a glass or glass-like material such as barium aluminum silicate ceramic. Selection of an appropriate insulating material depends to a large extent on the ability of the material to withstand the large flux of 14.1 Mev. neutrons produced by the D-T burn. It will be understood that transmission line feeds 5 are bordered by electrical insulation similar to that shown for coil 4.

In the presence of the rising and falling compression field there will be eddy-current losses in the conducting lithium and carbon of blanket 15. By suitably subdividing these conductors, however, these eddy-current losses can be made arbitrarily small. The requisite subdivision is readily accomplished by means of a plurality of electrical insulators 38, 39, 40 located respectively in regions 31, 32, and 33 of blanket 15.

Numerous tradeoffs are possible within the embodiment shown in FIGS. 5 and 7. For example, joule losses within compression coil 6 may be considered as unacceptably high at room temperature operation. Should this be the case, coil 6 may readily be modified by the addition of coolant channels through which liquid nitrogen may be flowed. It should be remembered, however, that a small percentage of the neutrons produced by the D-T burn pass through coil 6. These would deposit a certain amount of energy in the liquid nitrogen. The refrigerating power required to pump heat from coil 6 to maintain it at the desired low temperature may thus become too high to make this means of reducing joule losses economically advantageous. Therefore, the actual temperature at which coil 6 operates becomes a tradeoff between these considerations.

Additionally, the radius of coil 6 determines the amount of magnetic energy required for the operation of the reactor and hence the amount of magnetic energy that must be stored in the cryogenic system. Should this amount of energy be determined to be too high, the radius of coil 6 may be reduced to bring the magnetic energy storage requirements to a more acceptable value. This would of course necessitate a reduction in the size of inner blanket 15 and hence reduce the amount of tritium that could be bred in that blanket and the amount of shielding of the compression coil. Again, it is a matter of tradeoffs that can readily be made within the design constraints of the embodiment shown in FIGS. 5 and 7.

The dimensions of the reactor core and outer blanket 19 may vary substantially depending upon the particular parameters sought to be maximized. In the embodiment shown in FIGS. 5 and 7, the diameter of the radiation shield 20 is somewhat less than 3 meters, the radius of shock-heating coil 4 is 30 cm., and the radius of compression coil 6 is about three times that of shock-heating coil 4. It will be understood, however, that the reactor disclosed herein is in now way limited to these particular dimensions.

Figure 8:
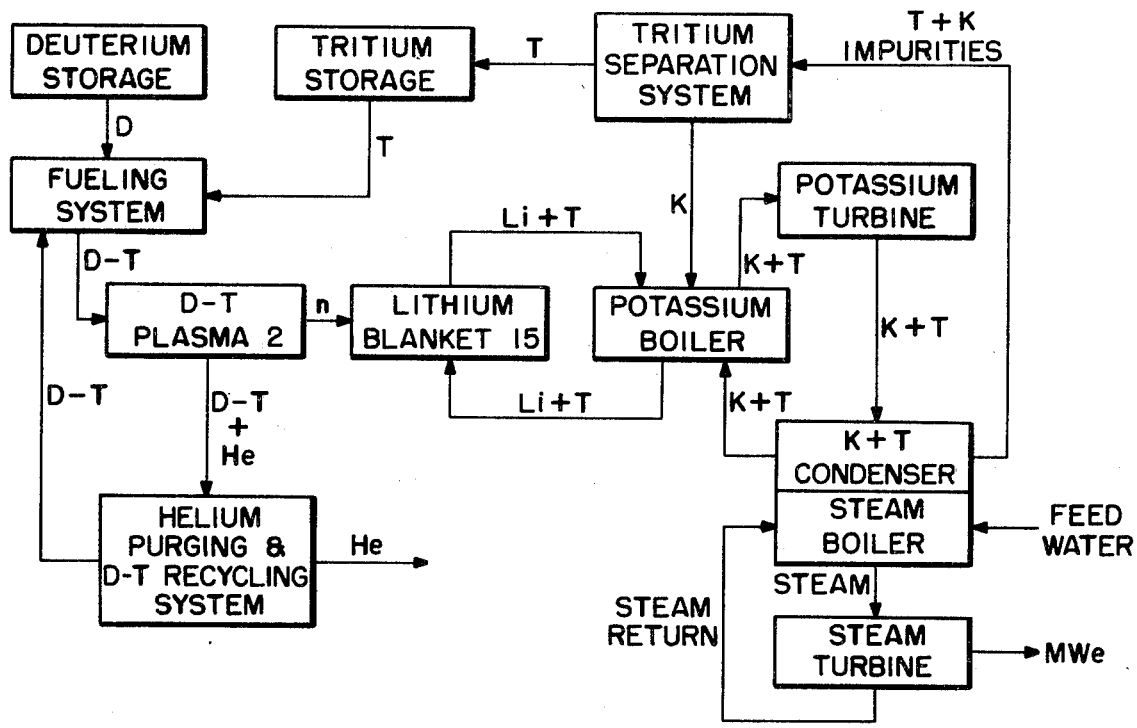
FIG. 8 is a block diagram of one mode of heat removal and tritium recovery useful with the reactor of this invention.

FIG. 8 indicates one manner in which heat may be removed from the reactor and used to generate electricity (mwe.). It also shows how tritium may be recovered and cycled to a fueling system for consumption in the reactor. Hot lithium flows from blanket 15 to a potassium boiler wherein heat is exchanged which serves to vaporize potassium. At the same time tritium in the lithium diffuses through a barrier and mixes with the potassium vapor produced within the potassium boiler. The mixture of potassium vapor and tritium gas enters a potassium turbine where the potassium vapor drives the turbine, giving up heat in the process. The potassium then circulates to a steam boiler where it exchanges a remaining portion of its heat to produce high temperature steam. The cooled potassium circulates to the potassium boiler to repeat the cycle and the steam is used to drive a steam turbine. Low temperature steam from the steam turbine is used as the feed for the steam boiler. The tritium gas passes through a tritium separation system wherein potassium vapor is removed. The condensed potassium is returned to the potassium boiler and the separated and purified tritium is transferred to a storage area. Before being circulated to the fueling system for the reactor, it is mixed with an appropriate amount of deuterium from a deuterium store to provide a D-T mixture in the desired ratio for fueling the reactor. Unburned D-T from the reactor also enters the fueling system from the helium purging and D-T recycling system. An appropriate amount of D-T fuel is pumped into the reactor between burning pulses.

What we claim is:

1. A pulsed, high-beta fusion reactor comprising in combination: (a) apparatus for producing a staged $\theta$ pinch, said apparatus comprising a first inner coil for producing a shock heating magnetic field and a second outer coil for producing a compressional and confining magnetic field and said apparatus having separate energy sources for the shock heating and adiabatic compression stages, (b) means for tritium breeding, (c) means for converting neutronic energy to heat, (d) means for extracting said heat from the reactor core, (e) a vacuum chamber, and (f) means for admitting a D-T fuel mixture into said vacuum chamber and purging helium therefrom.

2. The reactor of claim 1 wherein the energy source for said first coil is a capacitor bank and the energy source for said second coil is a cryogenic magnetic energy store, said apparatus for producing a staged $\theta$ pinch having means for reversibly switching magnetic energy into and out of said magnetic energy store, and said means for tritium breeding and said means for converting neutronic energy into heat being a first neutronic blanket having a substantial content of lithium.

3. The reactor of claim 2 wherein said first neutronic blanket is located between said first coil and said second coil and said means for extracting heat comprises liquid lithium circulating through said first neutronic blanket.

4. The reactor of claim 3 wherein said lithium is divided into normal lithium and enriched $^6$Li components and means for multiplying and moderating neutrons are incorporated into said first neutronic blanket.

5. The reactor of claim 4 wherein said neutron multiplying means is beryllium and said neutron moderating means is graphite.

6. The reactor of claim 3 wherein said first coil comprises the wall of said vacuum chamber.

7. The reactor of claim 6 wherein said first coil is cooled by said circulating liquid lithium and is electrically insulated from the contents of said vacuum chamber and said liquid lithium.

8. The reactor of claim 7 wherein the components of said first neutronic blanket are divided into segments by a plurality of electrical insulators extending radially outward from said first coil through said first neutronic blanket.

9. The reactor of claim 7 having a second neutronic blanket for tritium breeding located adjacent to but outside said second coil.

10. The reactor of claim 9 wherein said second coil is electrically and thermally insulated from said first and second neutronic blankets.

11. The reactor of claim 2 wherein said second coil comprises a plurality of multiturn high-voltage transmission lines.

12. The reactor of claim 11 wherein said first coil is connected to said second coil by a plurality of high-voltage transmission lines and the energy to drive said first and said second coils is supplied through common transmission lines.

13. The reactor of claim 11 having a supporting structure immediately adjacent to the outer circumference of said second coil whereby hoop forces developed in said second coil may be readily contained.

14. The reactor of claim 2 wherein beta is about one.

15. The reactor of claim 14 having means for directly converting work performed by expansion of the high-beta plasma against the confining magnetic field as a result of the D-T burn into electrical energy.

References Cited

Plasma Physics and Thermonuclear Research, vol. 2 (1963), pp. 61, 150–155.

REUBEN EPSTEIN, Primary Examiner

U.S. Cl. X.R.

176—9